US008976646B2

(12) United States Patent
Zhao et al.

(10) Patent No.: US 8,976,646 B2
(45) Date of Patent: Mar. 10, 2015

(54) POINT TO MULTI-POINT BASED MULTICAST LABEL DISTRIBUTION PROTOCOL LOCAL PROTECTION SOLUTION

(71) Applicant: Futurewei Technologies, Inc., Plano, TX (US)

(72) Inventors: Qianglin Quintin Zhao, Boxborough, MA (US); Lujun Wan, Shenzhen (CN); Tao Zhou, Beijing (CN); Ying Chen, Clearwater, FL (US)

(73) Assignee: Futurewei Technologies, Inc., Plano, TX (US)

( * ) Notice: Subject to any disclaimer, the term of this patent is extended or adjusted under 35 U.S.C. 154(b) by 237 days.

(21) Appl. No.: 13/673,806

(22) Filed: Nov. 9, 2012

(65) Prior Publication Data

US 2013/0121169 A1 May 16, 2013

Related U.S. Application Data

(60) Provisional application No. 61/558,879, filed on Nov. 11, 2011.

(51) Int. Cl.
*H04L 1/00* (2006.01)
*H04L 12/26* (2006.01)

(52) U.S. Cl.
USPC ............................. 370/228; 370/219; 370/225

(58) Field of Classification Search
CPC ......... H04L 45/28; H04L 45/22; H04L 45/00; H04L 1/22
USPC .................................. 370/217–221, 225, 228
See application file for complete search history.

(56) References Cited

U.S. PATENT DOCUMENTS

| 2003/0152024 A1* | 8/2003 | Yang et al. .................... 370/216 |
| 2009/0185478 A1 | 7/2009 | Zhang |
| 2009/0219806 A1 | 9/2009 | Chen et al. |
| 2011/0069609 A1 | 3/2011 | Le Roux et al. |
| 2011/0199891 A1 | 8/2011 | Chen |

FOREIGN PATENT DOCUMENTS

EP 2071768 A1 6/2009

OTHER PUBLICATIONS

Atlas, A., et al., "Algorithms for Computing Maximally Redundant Trees for IP/LDP Fast-Reroute," draft-enyedi-rtgwg-mrt-frr-algorithm-01, Mar. 12, 2012, 47 pages.
Atlas, A., Ed., et al., "An Architecture for IP/LDP Fast-Reroute Using Maximally Redundant Trees," draft-ietf-rtgwg-mrt-frr-architecture-01, Mar. 12, 2012, 26 pages.

(Continued)

*Primary Examiner* — Ronald Abelson
(74) *Attorney, Agent, or Firm* — Conley Rose, P.C.; Grant Rodolph; William H. Dietrich (57) ABSTRACT

In one aspect, the disclosure includes an apparatus comprising a processor configured to function as a merge point (MP) in a point to multi-point (P2MP) backup label switching path (LSP) for a primary LSP, receive P2MP backup LSP information originating from a protected node, wherein the P2MP backup LSP information comprises the identity of a point of local repair (PLR), determine a backup label switching router (LSR), and send a message with the identity of the backup LSR to an upstream node.

18 Claims, 6 Drawing Sheets

(56) References Cited

OTHER PUBLICATIONS

Minei, I., Ed., et al., "Label Distribution Protocol Extensions for Point-to-Multipoint and Multipoint-to-Multipoint Label Switched Paths," draft-ietf-mpls-ldp-p2mp-15, Aug. 4, 2011, 40 pages.

Wijnands, IJ., Ed., et al., "mLDP Node Protection," draft-wijnands-mpls-mldp-node-protection-01, Jun. 25, 2012, 19 pages.

Zhao, Q., et al., "LDP Extensions for Multi Topology Routing," draft-ietf-mpls-ldp-multi-topology-01.txt, Oct. 31, 2011, 21 pages.

Zhao, Q., et al., "LDP Extensions for Multi Topology Routing," draft-ietf-mpls-ldp-multi-topology-04.txt, Jul. 16, 2012, 18 pages.

Bradner, S., "Key Words for Use in RFCs to Indicate Requirement Levels," RFC 2119, Mar. 1997, 3 pages.

Rosen, E., et al., "Multiprotocol Label Switching Architecture," RFC 3031, Jan. 2001, 57 pages.

Andersson, L., et al., "The Multiprotocol Label Switching (MPLS) Working Group Decision on MPLS Signaling Protocols," RFC 3468, Feb. 2003, 12 pages.

Andersson, L., Ed., et al., "LDP Specification," RFC 5036, Oct. 2007, 127 pages.

Thomas, B., et al., "LDP Capabilities," RFC 5561, Jul. 2009, 13 pages.

Le Roux, J., Ed., et al., "Requirements for Point-to-Multipoint Extensions to the Label Distribution Protocol," RFC 6348, Sep. 2011, 21 pages.

Wijnands, IJ., Ed., et al., "Label Distribution Protocol Extensions for Point-to-Multipoint and Multipoint-to-Multipoint Label Switched Paths," RFC 6388, Nov. 2011, 40 pages.

Wijnands, IJ., et al., "Using Multipoint LDP When the Backbone Has No Route to the Root," RFC 6512, Feb. 2012, 13 pages.

Wijnands, et al., "Label Distribution Protocol Extensions for Point-to-Multipoint and Multipoint-to-Multipoint Label Switched Paths," RFC 6388, Nov. 1, 2011, 39 pages.

Zhao, Q., et al., "P2MP Based mLDP Node Protection Mechanism for Label Distribution Protocol P2MP/MP2MP Label Switched Paths," draft-zhao-mpls-mldp-protections-03.txt, Oct. 22, 2012, 23 pages.

Zhao, Q., et al., "Protection Mechanism for Label Distribution Protocol P2MP/MP2MP Label Switched Paths," draft-zhao-mpls-mldp-protections-00.txt, Oct. 24, 2011, 17 pages.

Foreign Communication From a Counterpart Application, PCT Application PCT/US2012/064519, International Search Report dated Jan. 28, 2013, 6 pages.

Foreign Communication From a Counterpart Application, PCT Application PCT/US2012/064519, Written Opinion dated Jan. 28, 2013, 11 pages.

\* cited by examiner

POINT TO MULTI-POINT BASED MULTICAST LABEL DISTRIBUTION PROTOCOL LOCAL PROTECTION SOLUTION

CROSS-REFERENCE TO RELATED APPLICATIONS

This application claims priority to U.S. Provisional Application No. 61/558,879, filed Nov. 11, 2011 titled "Point to Multi-Point Based Multicast Label Distribution Protocol Local Protection Solution," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Multiprotocol Label Switching (MPLS) Label Distribution Protocol (LDP) can be used to set up Point-to-Multipoint (P2MP) and Multipoint-to-Multipoint (MP2MP) Label Switched Paths (LSPs). The set of LDP extensions for setting up P2MP or MP2MP LSPs may be referred to as multipoint LDP (mLDP), which may be specified in Internet Engineering Task Force (IETF) Request for Comments (RFC) 6388, titled "Label Distribution Protocol Extensions for Point-to-Multipoint and Multipoint-to-Multipoint Label Switched Paths," which is hereby incorporated by reference. Certain targeted-LDP (T-LDP) protocols may be used herewith according to RFC 5036, titled "LDP Specification" and RFC 5561, titled "LDP Capabilities," which are hereby incorporated by reference.

In order to meet user demands, operators and service providers continue to deploy multicast applications using mLDP across MPLS networks. In certain key scenarios, conventional Internet Gateway Protocol (IGP)-mLDP convergence mechanisms fail to meet protection switching times required to minimize, or negate entirely, application interruptions for real-time applications, including stock trading, on-line games, and multimedia teleconferencing. Often, service protection paradigms include a pre-computation and establishment of a backup LSP. Once a failure has been detected on the primary LSP, the traffic may be transmitted across the backup LSP.

SUMMARY

In one aspect, the disclosure includes an apparatus comprising a processor configured to function as a merge point (MP) in a P2MP backup LSP for a primary LSP, receive P2MP backup LSP information originating from a protected node, wherein the P2MP backup LSP information comprises the identity of a point of local repair (PLR), determine a backup label switching router (LSR), and send a message with the identity of the backup LSR to an upstream node.

In another aspect, the disclosure includes an apparatus comprising a memory, a processor coupled to the memory, wherein the memory comprises instructions that cause the processor to function as a PLR in a P2MP backup LSP for a primary LSP, advertise its ability to function as a PLR in a P2MP backup LSP, receive a message with the identity of the proximate backup node along the P2MP backup LSP.

In yet another aspect, the disclosure includes a method of protecting a network node, comprising setting up a P2MP LSP from an upstream PLR through a protected node to a plurality of merge points, and setting up a backup P2MP LSP from the upstream PLR to the merge points, wherein the backup P2MP LSP avoids going through the protected node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The disclosure includes an inventive signaling mechanism supporting a method of protecting a node. The inventive signaling mechanism may provide for building a backup P2MP LSP instead of backup P2P LSPs. The signaling mechanism may permit all the involved nodes to distinguish the primary LSP from the backup LSP, eliminating the need for redundant, dual-feeding P2P methods of mLSP backup. The disclosure may further allow the downstream nodes of the protected node to locally merge the traffic back to the primary path using differing forwarding states to identify the primary LSP and the backup LSP.

Figure 1:
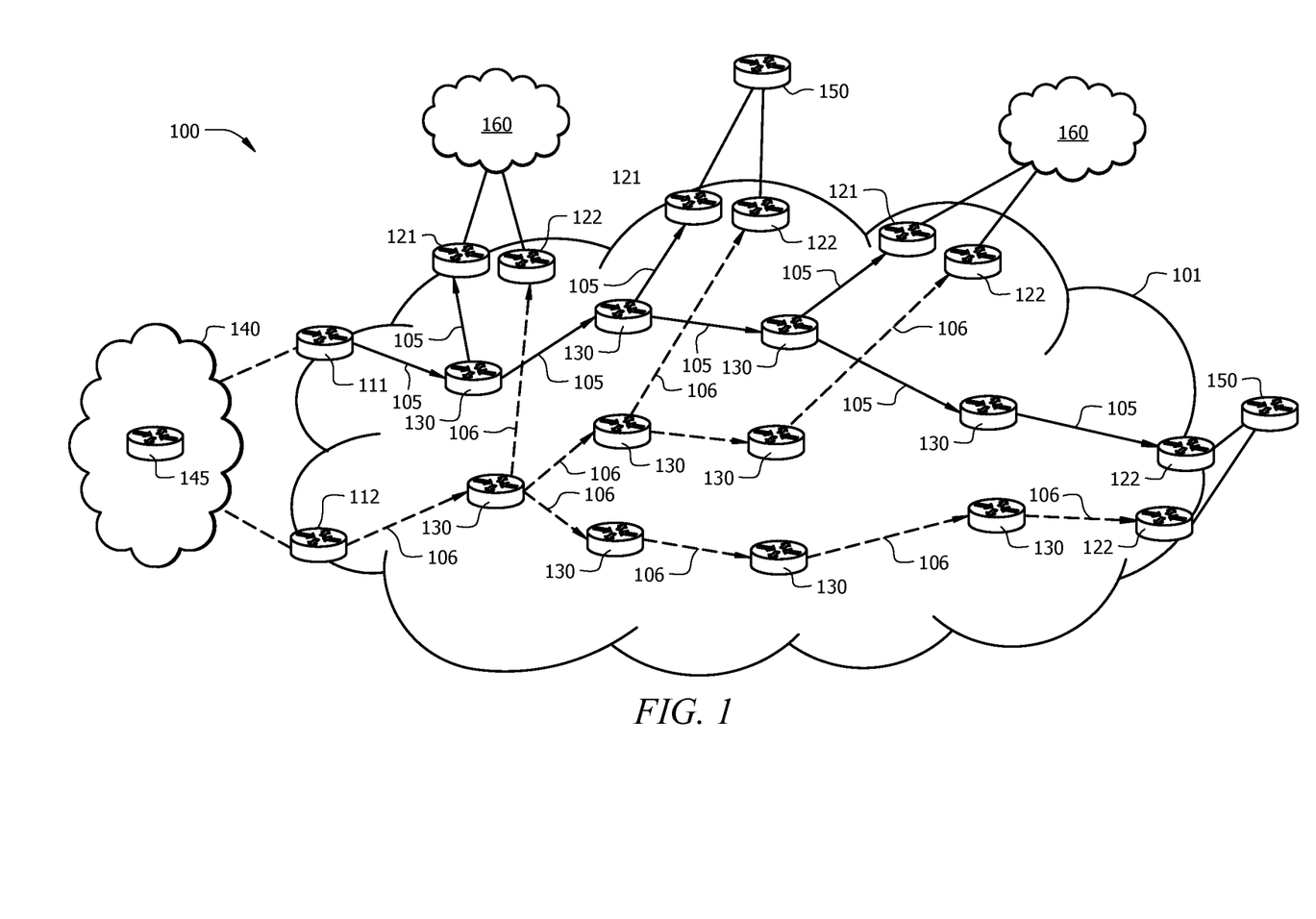
FIG. 1 is a schematic diagram of an embodiment of a label switched system.

FIG. 1 is a schematic of one example embodiment of a label switched system 100, where a plurality of P2P LSPs and P2MP LSPs may be established between at least some of the components. The P2P LSPs and P2MP LSPs may be used to transport data traffic, e.g., using packets and packet labels for routing. The label switched system 100 may comprise a label switched network 101, which may be a packet switched network that transports data traffic using packets or frames along network paths or routes. The packets may route or switch along the paths, which may be established using a label switching protocol, such as MPLS or generalized MPLS (GMPLS).

The label switched network 101 may comprise a plurality of edge nodes, including a first ingress node 111, a second ingress node 112, a plurality of first egress nodes 121, and a plurality of second egress nodes 122. When a P2MP LSP in the label switched network 101 comprises at least some of the edge nodes, the first ingress node 111 and second ingress node 112 may be referred to as root nodes, and the first egress nodes 121 and second egress nodes 122 may be referred to as leaf nodes. Additionally, the label switched network 101 may comprise a plurality of internal nodes 130, which may communicate with one another and with the edge nodes. The first ingress node 111 and the second ingress node 112 may communicate with a source node 145 at a first external network 140, such as an Internet Protocol (IP) network, which may be coupled to the label switched network 101. As such, the first ingress node 111 and the second ingress node 112 may transport data, e.g., data packets, between the label switch network 101 and the external network 140. Further, some of the first egress nodes 121 and second egress nodes 122 may be grouped in pairs, where each pair may be coupled to a second external network or a client (not shown).

In an example embodiment, the edge nodes and internal nodes 130 (collectively, network nodes) may be any devices or components that support transportation of the packets through the label switched network 101. For example, the network nodes may include switches, routers, or various combinations of such devices. The network nodes may receive packets from other network nodes, determine which network nodes to send the packets to, and transmit the packets to the other network nodes. In some embodiments, at least some of the network nodes may be LSRs, which may be configured to modify or update the labels of the packets transported in the label switched network 101. Further, at least some of the edge nodes may be label edge routers (LERs), which may be configured to insert or remove the labels of the packets transported between the label switched network 101 and the external network 140.

The label switched network 101 may comprise a first P2MP LSP 105, which may be established to multicast data traffic from the first external network 140 to the destination nodes 150 or other networks 160. The first P2MP LSP 105 may comprise the first ingress node 111 and at least some of the first egress nodes 121. The first P2MP LSP 105 is shown using solid arrow lines in FIG. 1. To protect the first P2MP LSP 105 against link or node failures, the label switched network 101 may comprise a second P2MP LSP 106, which may comprise the second ingress node 112 and at least some of the second egress nodes 122. The second P2MP LSP 106 is shown using dashed arrow lines in FIG. 1. Each second egress node 122 may be paired with a first egress node 121 of the first P2MP LSP 105. The second P2MP LSP 106 may also comprise some of the same or completely different internal nodes 130.

Figure 2:
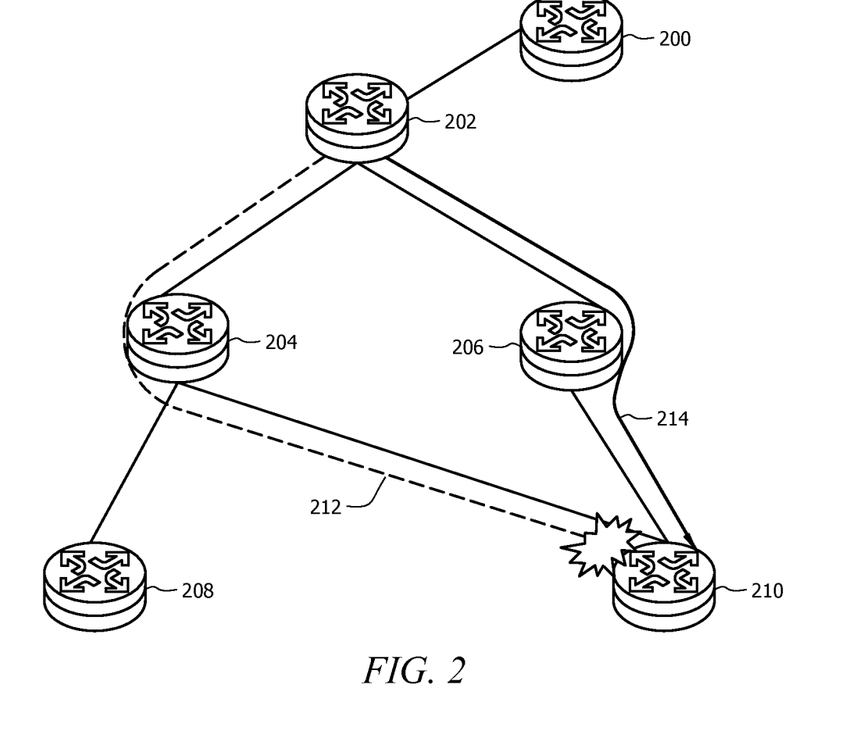
FIG. 2 is a schematic diagram of an embodiment of an mLDP LSP protected by a point-to-point (P2P) LSP.

FIG. 2 shows an mLDP LSP protected by a P2P LSP. The components of FIG. 2 may be substantially the same as the components of FIG. 1, wherein the root 200 corresponds to ingress node 111 and/or 112, nodes 202, 204, 206, 208 and 210 correspond to internal nodes 130, nodes 208 and 210 may correspond to egress nodes 121 and/or 122, and LSPs 212 and 214 may correspond to LSPs 105 and/or 106. For traffic routed between node 200 and node 210, LSP 212 may be the primary LSP and LSP 214 may be the backup P2P LSP. During normal operations, traffic from node 200 may be forwarded to node 210 on both LSP 212 and LSP 214. Node 210 may disregard traffic received from LSP 214 during normal operation. The backup LSPs may be receiver-triggered. Upon a failure of primary LSP 212, node 210 may begin accepting traffic from LSP 214. Thus, during normal operation, a traffic sender, e.g., node 200, may transmit traffic streams on both the primary and backup LSPs, e.g., LSP 212 and 214. Once the local traffic receiver, e.g., node 210, detects a failure of the primary LSP, the switchover to the backup LSP will be rapid. However, such methods of P2P backup protection may require significant bandwidth, as duplicate traffic continuously streams on both the primary and backup LSPs.

Figure 3A:
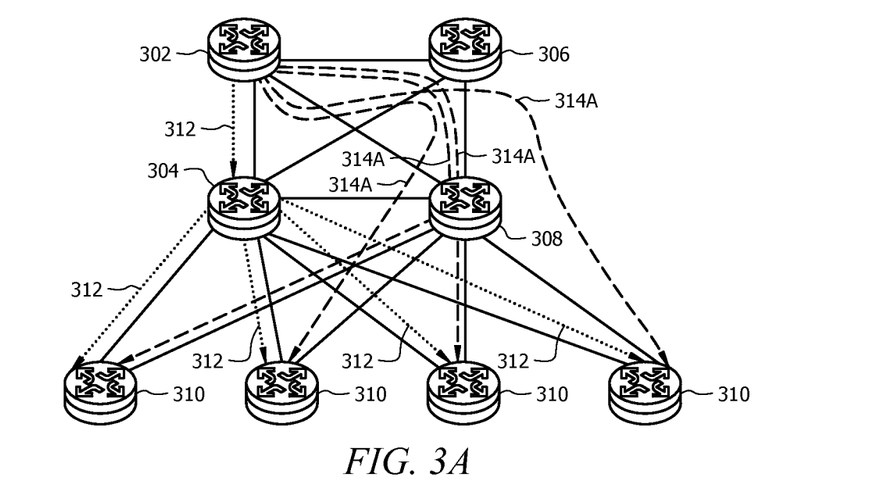
FIG. 3A is a flowchart of an embodiment of a method for establishing an mLDP LSP protected by multiple P2P LSPs.

FIG. 3A is a flowchart of an embodiment of a method for establishing an mLDP LSP protected by multiple P2P LSPs. The components of FIG. 3A may be substantially the same as the components of FIG. 1, wherein the root 302 corresponds to ingress node 111 and/or 112, nodes 304, 306, 308 and 310 correspond to internal nodes 130, nodes 310 may correspond to egress nodes 121 and/or 122, primary LSP 312 corresponds to primary LSP 106, and backup LSPs 314A correspond to backup LSP 105. As shown by the plurality of P2P backup LSPs 314A, FIG. 3A shows the potential for overloading on systems employing P2P LSP backup protection for an mLDP having several downstream nodes. In applications having relatively high data traffic, e.g., IP television (IPTV), nodes 306 and/or 308 may experience degraded performance where each P2P backup LSP 314A stream requires continuous transmissions to all leaf nodes.

Figure 3B:
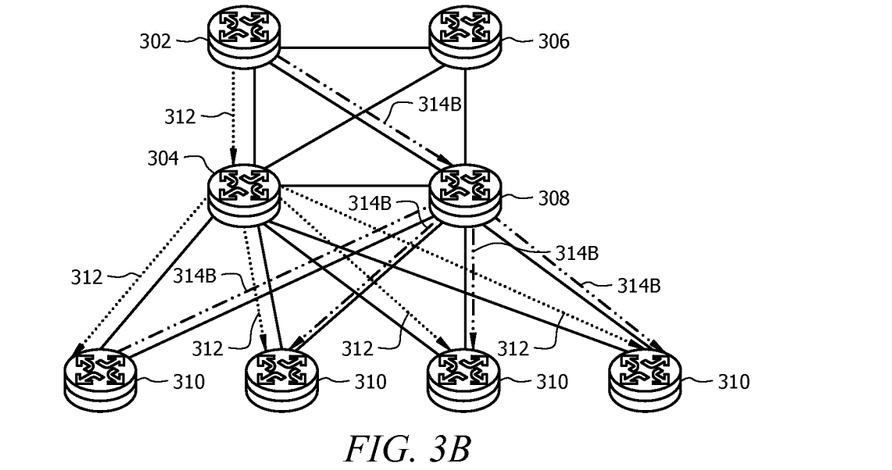
FIG. 3B is a flowchart of an embodiment of another method for establishing an mLDP LSP protected by a P2MP based mLDP local protection solution.

FIG. 3B is a flowchart of another embodiment of a method for establishing an mLDP LSP protected by a P2MP based mLDP local protection solution. The components of FIG. 3B may be the same as the components of FIG. 3A, with the exception of the backup LSP 314B. By replacing the plurality of backup LSPs 314A with a single P2MP backup LSP 314B, nodes 306 and/or 308 are less likely to experience degraded performance, and the potential for overloading on systems such as that of FIG. 3B is relatively less than that of systems such as that of FIG. 3A. One process for establishing and implementing such an embodiment is described below.

Figure 4:
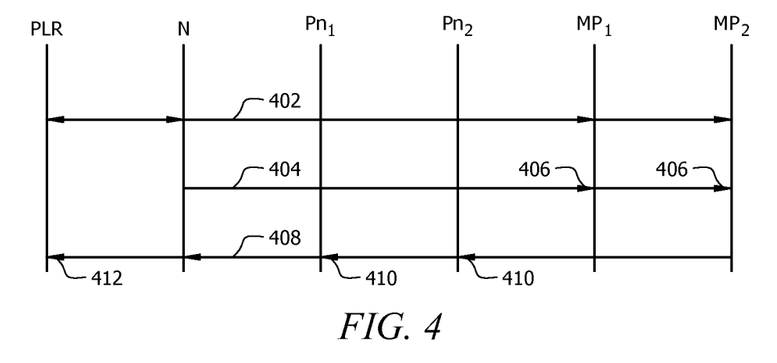
FIG. 4 is a protocol diagram of an embodiment of a method for establishing a P2MP based mLDP local protection solution.

FIG. 4 is a protocol diagram of an embodiment of a method for establishing a P2MP based mLDP local protection solution. Method 400 may begin at 402 with setting up a primary LSP, shown in FIG. 4 as having nodes $MP_1$ and $MP_2$, e.g., nodes 310 of FIG. 3B, a protected node (N), e.g., node 304 of FIG. 3B, and a PLR, e.g., node 302 of FIG. 3B. Methods, procedures and techniques of setting up the primary LSP may are well known and include those recited in RFC 6388. At the conclusion of 402, a primary mLSP, e.g., primary LSP 312 of FIG. 3, may be established. In some embodiments, the PLR may concurrently or separately advertise its capability of acting as a PLR to N, the MPs may advertise to N that they are capable of acting as MPs, and internal nodes, e.g., nodes 306 and 308 of FIG. 3, may advertise to the MPs that they are capable of acting as backup path nodes. Advertisements may be made using a Capability Parameter TLV 600 of FIG. 6, discussed further herein. At 404, N informs all of its downstream MPs of the backup LSP information, e.g., by sending a Notification message as described in RFC 6388, containing the PLR's identity and mLDP FEC, e.g., in a LDP MP SVE 700 of FIG. 7 as discussed further herein. Sending this information downstream may initiate the backup LSR determination among downstream nodes, described further below. In some embodiments, subsequently added downstream nodes may also receive Notification messages from N in like manner.

At 406, $MP_1$ and $MP_2$ may receive information from the N, e.g., a Notification message, and locally determine the LSR on the backup LSP toward the PLR according to the IGP results. For example, an MP may choose the upstream LSR, e.g., $P_{n1}$, $P_{n2}$, based on the shortest path as a candidate. Alternately, an MP may choose the next-hop on N's detour path as a candidate. The detour path may be IGP fast re-route (FRR) path or other topologies' disjoint paths. The IGP-FRR path may be provided by loop-free alternate (LFA), U-Turn, or another mechanism as known in the art. Disjoint paths may be provided by Multi-Topology (MT), maximally redundant tree (MRT), or another mechanism as known in the art. MRT selection includes the description set forth in the IETF draft draft-enyedi-rtgwg-mrt-frr-algorithm-02, titled "Algorithms for computing Maximally Redundant Trees for IP/LDP Fast-Reroute," which is incorporated herein by reference. Additionally, the MP may bind the primary next-hop label forwarding entry (NHLFE) to both the backup and primary incoming label map (ILM) entries, which may enable the MP to locally merge traffic received along the backup mLDP LSP to the primary LSP.

Figure 8:
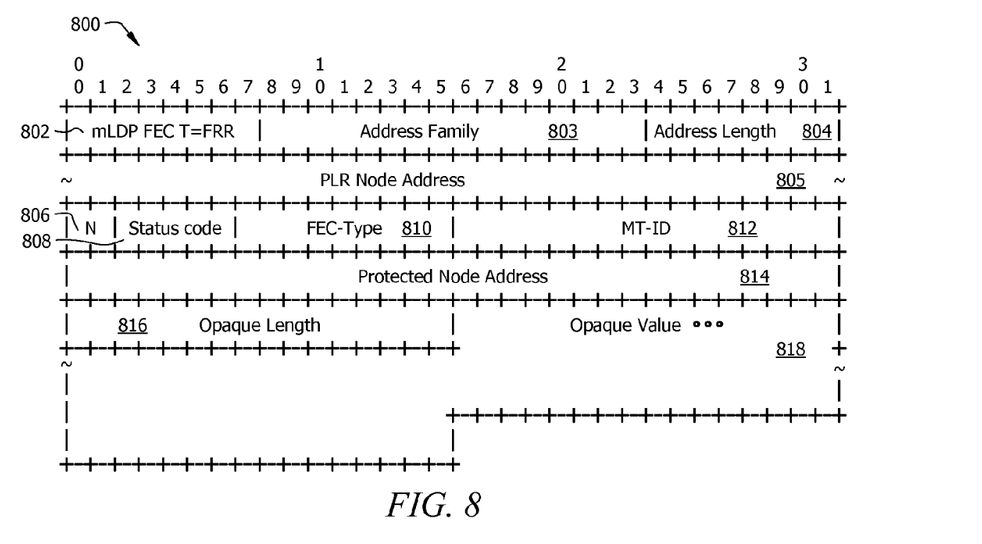
FIG. 8. is a schematic diagram of an embodiment of an mLDP Backup Forward Equivalence Class (FEC) Element for use with a P2MP Based mLDP Local Protection Solution.

At 408, $MP_1$ and $MP_2$ may send out a message, e.g., a FRR label mapping message such as mLDP Backup FEC Element 800 of FIG. 8, discussed further herein, to the MPs' upstream node(s). This message may include information concerning the backup LSP, e.g., a key including the PLR identity, the N identity and the original mLDP FEC, and MT Identifier (MT-ID) if the backup LSP is not in the default topology. The MPs' assigned label for the backup LSP may be different from the primary LSP to avoid $MP_1$ and/or $MP_2$ feeding the primary traffic to its backup LSP's downstream LSRs.

When a non-PLR node along the backup LSP, e.g., $P_{n1}$ and/or $P_{n2}$, which may separately be node 308 along backup LSP 314B of FIG. 3B, receives an FRR label mapping message from a downstream LSR, shown at 410, the non-PLR node may consider itself a backup LSP node and locally select its upstream node along the backup LSP, e.g., node 306 of FIG. 3B, toward the PLR on the corresponding topology's shortest IGP path. Additional path selection rules may be applied to avoid the backup LSP going through N. For example, the backup LSP node, e.g., the transit node, may be barred from selecting the N as its upstream LSR for the backup LSP. The primary LSP and backup LSP may also be selected to be maximally disjointed using static configurations or dynamic signaling using mechanisms such as MRT. Other possible rules will be apparent to those of skill in the art.

When a PLR node, e.g., node 302 of FIG. 3B, along the backup LSP receives message, e.g., an FRR label mapping message, from a downstream LSR, shown at 412, it may identify that it is the PLR by the mLDP backup FEC elements (described herein), decode the special opaque value (discussed herein), and generate the backup forwarding entry for the specific backup LSP. The backup forwarding entry for the backup LSP may be identified by the root address and opaque value in the special opaque value. The PLR may then bind the backup forwarding state to the specific primary LSP, which may be indicated by the N address contained in the FRR label mapping message. In some embodiments, there may be more than one backup forwarding entry for a specific N.

Figure 5:
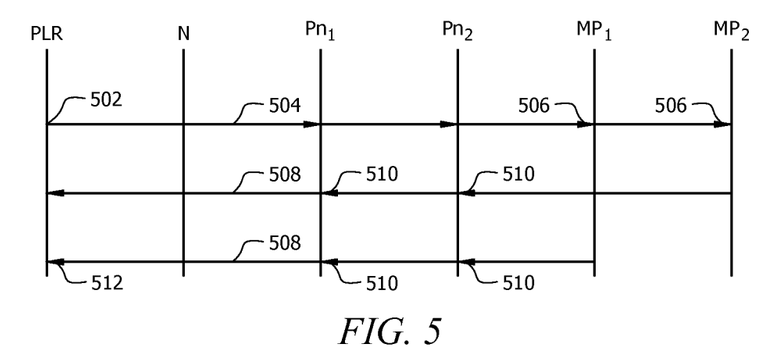
FIG. 5 is a protocol diagram of an embodiment of a P2MP based mLDP local protection solution upon failure of a protected node.

FIG. 5 is a protocol diagram of an embodiment of a P2MP based mLDP local protection solution upon failure of a protected node. Method 500 may begin at 502 with a PLR, e.g., node 302 of FIG. 3B, detecting the failure of a protected node N, e.g., node 304 of FIG. 3B. Failure detection protocols may include bidirectional failure detection as described by U.S. patent application Ser. No. 13/649,979, titled "Failure Detection in the Multiprotocol Label Switching Multicast Label Switched Path's End-to-End Protection Solution," incorporated herein by reference. Following failure detection, the PLR may switch traffic to transmit along the backup LSP at 504, e.g., using dual label stack, wherein the inner label is the outgoing label from N and the outer label is the backup LSP's outgoing label from the downstream backup path node. In some embodiments, a field in an FRR label mapping message, e.g., N Bit field 806 of FIG. 8, may contain instructions indicating the necessary conditions when traffic switchover by the PLR is permitted.

At 506, when $MP_1$ and/or $MP_2$ sees the next-hop to root changed, $MP_1$ and/or $MP_2$ may locally choose to receive traffic from the backup LSP, re-converge the traffic to the new primary LSP, withdraw the backup label, and leave the backup LSP. At 508, $MP_1$ and/or $MP_2$ may advertise the new mapping message(s). At 510, backup path nodes $P_{n1}$ and/or $P_{n2}$ may delete the specific backup LSP, e.g., according to procedures described in RFC 6388. At 512, once all the MPs, e.g., $MP_1$ and $MP_2$, and backup path nodes, e.g., $P_{n1}$ and $P_{n2}$, have left the backup P2MP LSP, the entire backup P2MP LSP may be deleted.

Figure 6:
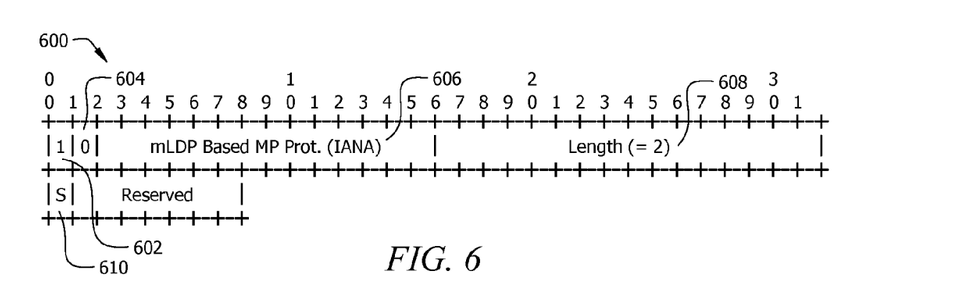
FIG. 6 is a schematic diagram of an embodiment of a Capability Parameter type-length-value (TLV) element.

FIG. 6 is a schematic diagram of an embodiment of a Capability Parameter TLV element. The Capability Parameter TLV 600 may be unidirectionally announced from an LSR, e.g., nodes 302, 304, 306, 308, and/or 310 of FIG. 3B, to inform network peers of the LSR's ability to support the P2MP Based mLDP Local Protection Solution. The "U-Bit" field 602 may be an "unknown TLV bit," as described in RFC 5036, and may indicate either '0' or '1' as specified in the Capability document associated with the given capability. The "F-Bit" field 604 may be a "forward unknown TLV bit," as described in RFC 5036, and may be a '0' when the Capability Parameter TLV is sent only in Initialization and Capability messages, which may not be forwarded. The "TLV Code Point" field 606 may identify a specific capability through a code point assigned by Internet Assigned Names Authority (IANA). The "Length" field 608 may indicate the length of the Capability Parameter TLV 600 in octets. The "S-Bit" field 610 may be a state bit, and may indicate whether the sender is advertising (e.g., using '1') or withdrawing (e.g., using '0') the capability corresponding to the TLV code point. Without receiving this capability announcement, a network LSR may not send any message which includes the below-described Status Element and mLDP Backup FEC Element to its peers. In some embodiments, the capability announcement includes information sufficient to distinguish the capabilities of different nodes, e.g., PLR, MP, N, backup node, etc.

Figure 7:
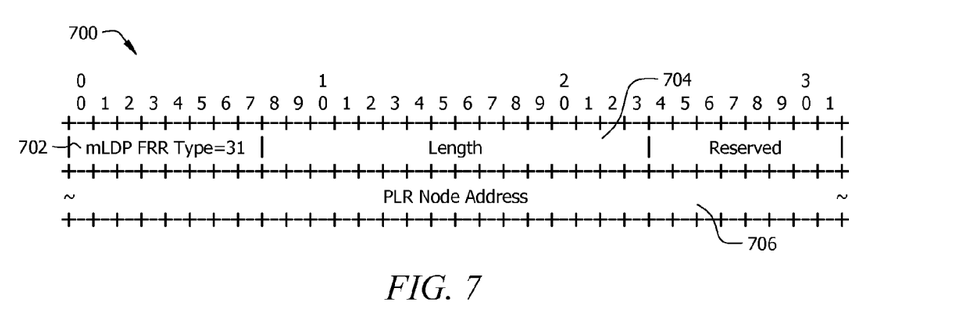
FIG. 7 is a schematic diagram of an embodiment of a LDP MP Status Value Element (SVE).

FIG. 7 is a schematic diagram of an embodiment of a LDP MP SVE 700. The LDP MP SVE may utilize T-LDP as documented in RFC 5036 and RFC 5561. The "Type" field 702 may indicate the type of the LDP MP SVE 700, including without limitation types specified by IANA. The "Length" field 704 may indicate the length of the SVE 700 in octets. If the Address Family is IPv4, the Length may be 5; if the Address Family is IPv6, the Length may be 17. The "PLR Node Address" field 706 may contain the host address of the PLR, e.g., PLR 302 of FIG. 3B.

FIG. 8. is a schematic diagram of an embodiment of an mLDP Backup FEC Element 800 for use with a P2MP Based mLDP Local Protection Solution. The "Type" field 802 may indicate the type of the mLDP Backup FEC, e.g., FRR, including without limitation types specified by IANA. The "Address Family" field 803 may indicate the IP version, e.g., IPv4 or IPv6. The "Length" field 804 may indicate the length of the mLDP Backup FEC Element 800 in octets. If the Address Family is IPv4, the Length may be 9; if the Address Family is IPv6, the Length may be 33. The "PLR Node Address" field 805 may contain the host address of the PLR, e.g., PLR 302 of FIG. 3B. The "N Bit" field 806 may be the Node Failure Required Flag, and may specify the occasion of switching traffic on a PLR. When the N Bit 806 indicates 'Y' or 'Yes' (e.g., '1'), traffic may switch to the backup path when the PLR only detects the node failure. When the N Bit field 806 indicates 'N' or 'No' (e.g., '0'), traffic may switch to the backup path when the PLR detects any failure. The "Status Code" field 808 may indicate the forwarding path, e.g., setting '1' for primary path traffic forwarding and setting '2' for secondary path traffic forwarding. The "FEC-Type" field 810 may indicate the FEC type, e.g., setting '6' for P2MP FEC types, setting '7' for MP2MP-up FEC types, and/or setting '8' for MP2MP-down FEC types. The "MT-ID" field 812 may provide the multi-topology identification setting forth the appropriate mLDP topology. The "Protected Node Address" field 814 may provide the host address of the protected node, e.g., node 304 of FIG. 3B. The "Opaque Length" field 816 may indicate the length of the opaque value in octets. The "Opaque Value" field 818 may comprise one or more MP opaque value elements, as defined by RFC 6388. Specifically, for the FRR mLDP FEC Element, the Opaque Value may be encoded as the Recursive Opaque Value, as may be defined in RFC 6512, titled "Using Multipoint LDP When the Backbone Has No Route to the Root," incorporated herein by reference. The value fields of the Recursive Opaque Value may contain the original primary path's mLDP FEC element. The Opaque Value may be encoded by the MP, e.g., MP 310 of FIG. 3B, and decoded by the PLR, e.g., PLR 302 of FIG. 3B; other nodes may not interpret the Opaque Value.

Figure 9:
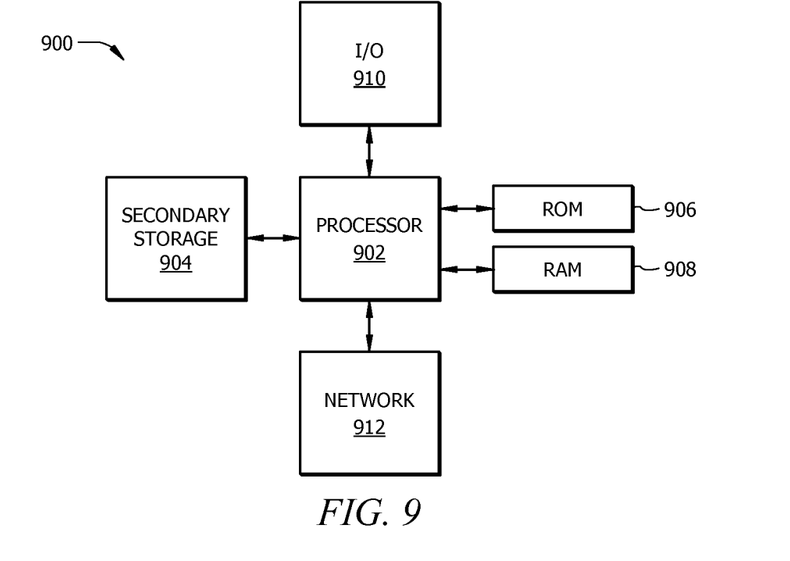
FIG. 9 is a schematic diagram of a typical general-purpose network component suitable for implementing one or more embodiments of the disclosed components.

The system and methods described above may be implemented on any general-purpose network component(s), such as those depicted in FIGS. 1-3A, 3B, with sufficient processing power, memory resources, and network throughput capability to handle the necessary workload placed upon it. FIG. 9 illustrates a typical, general-purpose network component 900 suitable for implementing one or more embodiments of the components disclosed herein. The network component 900 includes a processor 902 (which may be referred to as a central processor unit or CPU) that is in communication with memory devices including secondary storage 904, read only memory (ROM) 906, random access memory (RAM) 908, input/output (I/O) devices 910, and network connectivity devices 912. The processor 902 may be implemented as one or more CPU chips, or may be part of one or more application specific integrated circuits (ASICs) and/or digital signal processors (DSPs).

The secondary storage 904 is typically comprised of one or more disk drives or erasable programmable ROM (EPROM) and is used for non-volatile storage of data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage 904. The RAM 908 is used to store volatile data and perhaps to store instructions. Access to both ROM 906 and RAM 908 is typically faster than to secondary storage 904.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a processor configured to:
function as a merge point (MP) in a point to multipoint (P2MP) backup label switching path (LSP) for a primary LSP;
receive P2MP backup LSP information originating from a protected node, wherein the P2MP backup LSP information comprises the identity of a point of local repair (PLR);
determine a backup label switching router (LSR); and
send a message with the identity of the backup LSR to an upstream node and the backup LSR.

2. The apparatus of claim 1, wherein the message is a fast re-route (FRR) label mapping message.

3. The apparatus of claim 2, wherein the FRR label mapping message contains information comprising: a multipoint label distribution protocol (mLDP) forward equivalence class (FEC) type, a protected node address, a PLR address field, and an opaque value.

4. The apparatus of claim 1, wherein the determination of the backup LSR comprises selecting the backup LSR based on the shortest path.

5. The apparatus of claim 1, wherein the processor is further configured to advertise its capability of acting as a MP.

6. An apparatus comprising:
a processor configured to:
function as a merge point (MP) in a point to multipoint (P2MP) backup label switching path (LSP) for a primary LSP;
receive P2MP backup LSP information originating from a protected node, wherein the P2MP backup LSP information comprises the identity of a point of local repair (PLR);
determine a backup label switching router (LSR); and
send a message with the identity of the backup LSR to an upstream node,
wherein the determination of the backup LSR comprises selecting the backup LSR to create a maximally disjoint backup LSP.

7. An apparatus comprising:
a memory;
a processor coupled to the memory, wherein the memory comprises instructions that cause the processor to:
function as a point of local repair (PLR) in a point to multipoint (P2MP) backup label switching path (LSP) for a primary LSP;
advertise its ability to function as a PLR in a P2MP backup LSP; and
receive a message with the identity of the proximate backup node along the P2MP backup LSP,
wherein the message is a fast re-route (FRR) label mapping message containing a foreword equivalence class (FEC) element, wherein the message further comprises an opaque value, and wherein the processor is further configured to decode the opaque value.

8. The apparatus of claim 7, wherein instructions further cause the processor to the processor to generate the backup forwarding entry for the P2MP backup LSP and bind the backup forwarding state to the primary LSP.

9. The apparatus of claim 7, wherein instructions further cause the processor to the processor to switch traffic to transmit along the P2MP backup LSP when the PLR detects a node failure.

10. The apparatus of claim 7, wherein instructions further cause the processor to the processor to switch traffic to transmit along the P2MP backup LSP when the PLR detects a failure which either is a link failure or the combination of the link and node failure.

11. A method of protecting a network node, comprising:
setting up a primary point to multipoint (P2MP) label switching path (LSP) from an upstream point of local repair (PLR) through a protected node to a plurality of merge points; and
setting up a backup P2MP LSP from the upstream PLR to the merge points, wherein the backup P2MP LSP avoids going through the protected node,
wherein establishing a primary P2MP LSP comprises sending out a label mapping message from each non-ingress label switching router (LSR) along the primary P2MP LSP.

12. The method of claim 11, wherein establishing a backup P2MP LSP comprises sending a Notification message from a protected node to a plurality of downstream nodes, wherein the Notification message comprises the identity of the PLR and the multipoint label distribution protocol (mLDP) forward equivalence class (FEC).

13. The method of claim 12, wherein the Notification message comprises a fast re-route (FRR) label mapping message containing a type field, an address family field, a PLR node address field, an N-bit field, a status code field, a forward equivalence class (FEC)-type field, a multi-topology identification (MT-ID) field, a protected node address field, and an opaque value field.

14. The method of claim 12, wherein establishing a backup P2MP LSP occurs at a merge point (MP) and further comprises:
receiving the Notification message;
determining a secondary path toward the PLR according to the Internet Gateway Protocol (IGP) results;
encoding an opaque value; and
sending out a fast re-routing (FRR) label mapping message.

15. The method of claim 14, wherein establishing a backup P2MP LSP occurs at a non-PLR node upstream of the MP and further comprises:
receiving the FRR label mapping message; and
choosing a backup upstream node toward the PLR.

16. The method of claim 15, wherein establishing a backup P2MP LSP occurs at the PLR and further comprises:
receiving the FRR label mapping message;
identifying that it is the PLR;
decoding the opaque value;
generating a backup forwarding entry for the backup P2MP LSP; and
binding the backup forwarding state to the primary P2MP LSP.

17. The method of claim 11, wherein setting up a backup P2MP LSP comprises using a label distribution protocol (LDP) merge point status value element comprising a multi-LDP (mLDP) FRR type field and a PLR node address field.

18. The method of claim 11, wherein setting up a backup P2MP LSP comprises using capability parameter type-length-value (TLV) comprising a U-bit field, an F-bit field, a TLV code point field, and an S-bit field.

* * * * *